US009576197B2

(12) United States Patent
Lee

(10) Patent No.: US 9,576,197 B2
(45) Date of Patent: *Feb. 21, 2017

(54) METHODS AND APPARATUS FOR IDENTIFYING MEDIA CONTENT USING TEMPORAL SIGNAL CHARACTERISTICS

(71) Applicant: The Nielsen Company (US), LLC, Schaumburg, IL (US)

(72) Inventor: Morris Lee, Palm Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,566

(22) Filed: Nov. 10, 2014

(65) Prior Publication Data

US 2015/0067712 A1 Mar. 5, 2015

Related U.S. Application Data

(63) Continuation of application No. 13/337,890, filed on Dec. 27, 2011, now Pat. No. 8,887,191, which is a
(Continued)

(51) Int. Cl.
*G06K 9/00* (2006.01)
*H04N 21/84* (2011.01)
(Continued)

(52) U.S. Cl.
CPC ....... *G06K 9/0053* (2013.01); *G06K 9/00543* (2013.01); *H04H 60/58* (2013.01);
(Continued)

(58) Field of Classification Search
CPC ............ G06K 9/0053; G06K 9/00543; H04N 21/442; H04N 21/84; H04H 60/58; H04H 2201/90
(Continued)

(56) References Cited

U.S. PATENT DOCUMENTS 3,919,479 A 11/1975 Moon et al.
4,602,297 A 7/1986 Reese
(Continued)

FOREIGN PATENT DOCUMENTS

WO 2005041109 5/2005
WO 2005046201 5/2005

OTHER PUBLICATIONS

European Patent Office, "Extended European Search Report," issued in connection with European Application No. 09013712.6, Feb. 19, 2013, 8 pages.
(Continued)

*Primary Examiner* — Hoang-Vu A Nguyen-Ba
(74) *Attorney, Agent, or Firm* — Hanley, Flight & Zimmerman, LLC

(57) ABSTRACT

Methods and apparatus to identify media content using temporal signal characteristics are disclosed. An example method includes generating a reference signature based on a reference signal corresponding to known media, generating sums based on peaks in a media signal corresponding to media, identifying signal peaks based on the generated sums, generating a second signature based on normalized curve features, wherein the normalized curve features respectively correspond to the identified signal peaks at a corresponding temporal locations of the corresponding signal peak, and determining whether the media signal corresponds to the reference signal based on a comparison of the reference signature and the second signature.

34 Claims, 14 Drawing Sheets

Related U.S. Application Data continuation of application No. 12/261,899, filed on Oct. 30, 2008, now Pat. No. 8,108,887.

(51) Int. Cl.
  *H04H 60/58* (2008.01)
  *H04N 21/442* (2011.01)
  *H04N 21/44* (2011.01)

(52) U.S. Cl.
  CPC ........... *H04N 21/442* (2013.01); *H04N 21/84* (2013.01); *H04H 2201/90* (2013.01)

(58) Field of Classification Search
  USPC ............. 725/19, 18; 348/180, 181, 184, 185
  See application file for complete search history.

(56) References Cited

U.S. PATENT DOCUMENTS

| | | | |
|---|---|---|---|
| 4,697,209 A | 9/1987 | Kiewit et al. | |
| 6,226,608 B1 | 5/2001 | Fielder et al. | |
| 6,512,796 B1 | 1/2003 | Sherwood | |
| 6,513,161 B2 | 1/2003 | Wheeler et al. | |
| 6,597,405 B1 | 7/2003 | Iggulden | |
| 6,968,564 B1 | 11/2005 | Srinivasan | |
| 7,065,544 B2 | 6/2006 | Moreno | |
| 7,174,293 B2 | 2/2007 | Kenyon et al. | |
| 7,194,752 B1 | 3/2007 | Kenyon et al. | |
| 7,647,604 B2 | 1/2010 | Ramaswamy | |
| 8,108,887 B2 | 1/2012 | Lee | |
| 8,887,191 B2 | 11/2014 | Lee | |
| 2006/0195861 A1* | 8/2006 | Lee | 725/19 |

OTHER PUBLICATIONS

Goss et al., "Spectral Retrieval by Fuzzy Matching," Analytical Proceedings Including Analytical Communications, vol. 31, Jan. 1994, 4 pages.

United States Patent and Trademark Office, "Non-Final Office Action," issued in connection with U.S. Appl. No. 13/337,890, Jan. 27, 2014, 23 pages.

United States Patent and Trademark Office, "Notice of Allowance," issued in connection with U.S. Appl. No. 13/337,890, Jul. 9, 2014, 18 pages.

United States Patent and Trademark Office, "Non-Final Office Action," issued in connection with U.S. Appl. No. 12/261,899, Apr. 21, 2011, 19 pages.

United States Patent and Trademark Office, "Notice of Allowance," issued in connection with U.S. Appl. No. 12/261,899, Dec. 12, 2011, 20 pages.

European Patent Office, "Communication pursuant to Article 94(3) EPC," issued in connection with European Patent Application No. 09 013 712.6, received Oct. 26, 2016, 4 pages. Reference WO 2005/046201 therein was previously cited in IDS of Nov. 14, 2014 and considered on Jun. 13, 2015.

* cited by examiner

METHODS AND APPARATUS FOR IDENTIFYING MEDIA CONTENT USING TEMPORAL SIGNAL CHARACTERISTICS

RELATED APPLICATIONS

This patent arises from a continuation of U.S. patent application Ser. No. 13/337,890, filed Dec. 27, 2011 (now U.S. Pat. No. 8,887,191), which is a continuation of U.S. patent application Ser. No. 12/261,899, filed Oct. 30, 2008 (now U.S. Pat. No. 8,108,887). The entireties of U.S. patent application Ser. Nos. 13/337,890 and 12/261,899 are incorporated herein by reference.

FIELD OF THE DISCLOSURE

The present disclosure relates generally to identifying media content and, more specifically, to methods and apparatus for identifying media content using temporal signal characteristics.

BACKGROUND

The metering of media content (e.g., television programs, radio programs, audio information, video information, etc.) is typically performed by collecting consumption records (e.g., viewing records) or other consumption information from a group of statistically selected households. These viewing records are typically generated by identifying the media content displayed in these households.

Some techniques for identifying displayed media content are based on the use of audio and/or video signatures. In general, signature-based media content identification techniques use one or more characteristics of presented (but not yet identified) media content to generate a substantially unique signature (e.g., a series of digital values, a waveform, etc.) for that content. The signature information for the content being presented or rendered is then typically compared to signature information generated for known media content. When a substantial match is found, the media content can, with a relatively high probability, be identified as the known media content having substantially matching signature information.

Although the use of signatures to identify consumed media content is growing, known computationally efficient signature-based program identification techniques are not sufficiently reliable because these known techniques typically ignore important distinguishing characteristics of the media signal. As a result, such known techniques may limit or prevent the identification of media content and/or may result in an incorrect identification of that content.

DETAILED DESCRIPTION

For purposes of clarity, the following discussion describes systems, methods, apparatus, and articles of manufacture for identifying media content using temporal characteristics of an audio signal. However, the systems, methods, apparatus, and articles of manufacture described herein may be extended and/or modified to use temporal characteristics of any signal associated with the media content. For example, temporal characteristics of a video signal and/or a digital signal may be used instead of the example audio signal described herein.

Some example systems, methods, apparatus, and articles of manufacture described herein may be used to generate a signature from a media content signal by identifying the peaks and zero crossings of the media content signal and generating sums of the peaks. The sums may then be smoothed to form a curve, and the amplitudes or magnitudes and temporal locations of peaks in the curve may be identified to generate normalized curve features with equal height at the locations of the peaks. The height of the example signatures is set to zero at locations other than the locations of the peaks. The generated signatures may then be correlated with or compared to reference signatures to generate an index. If a correlation or comparison yields an index higher than a threshold, it may be determined that the media content signal is the same as the media content represented by the reference signature.

Figure 1:
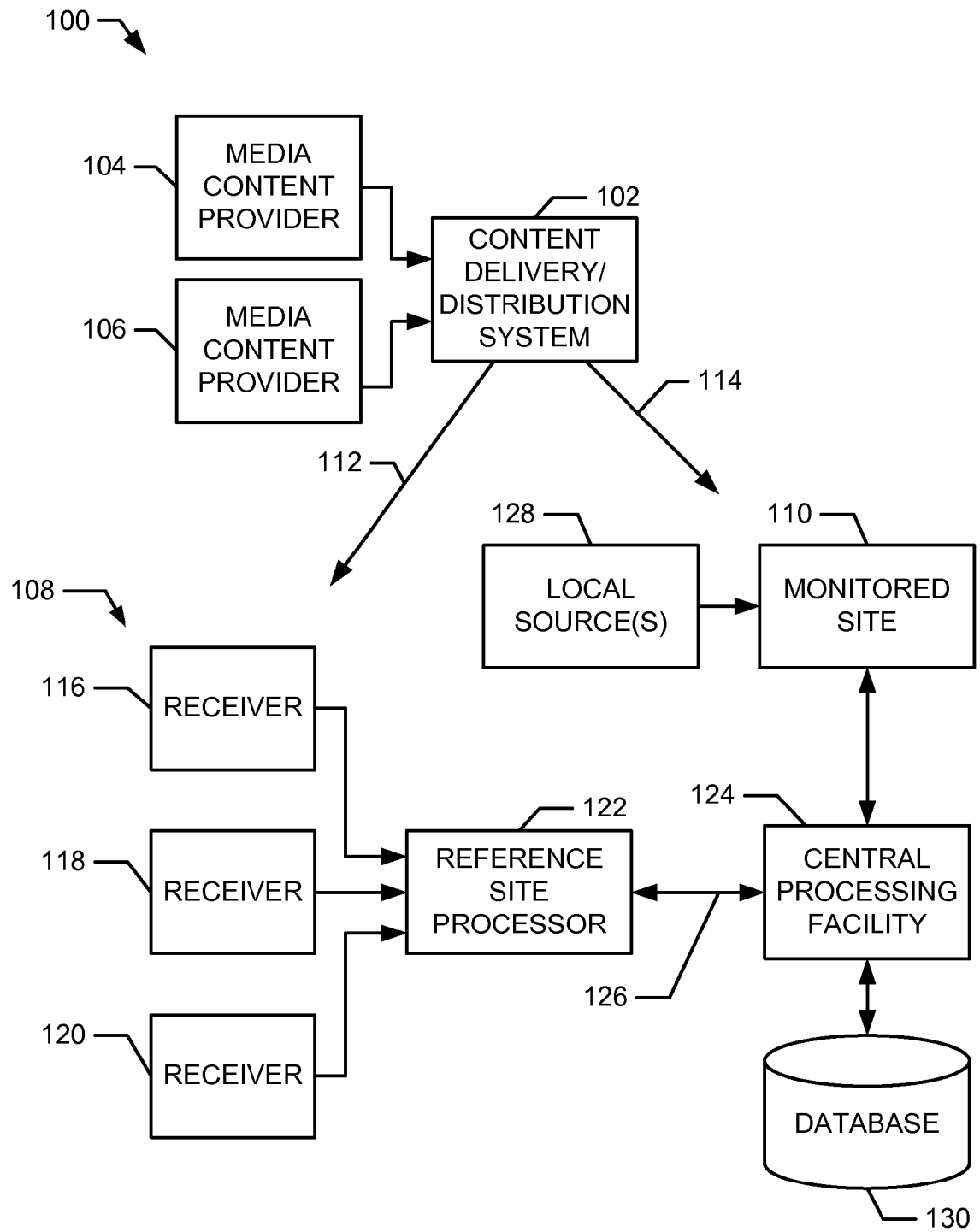
FIG. 1 is a block diagram of an example system within which the media content identification apparatus and methods described herein may be implemented.

FIG. 1 is a block diagram of an example system 100 within which the media content identification apparatus and methods described herein may be implemented. The example system 100 shown in FIG. 1 includes a content delivery/distribution system 102 that receives video and/or audio content from a plurality of media content providers 104 and 106. The content delivery/distribution system 102 may be any form of audio and/or video content delivery/distribution system. For example, the content delivery/distribution system 102 may include a radio broadcast station, a television broadcast station, a point-to-point network, a multipoint network, etc. The media content providers 104 and 106 may provide media content such as television programs, advertisements, audio (e.g., radio) programs, still image information (e.g., web pages), etc. in known manners to the content delivery/distribution system 102. The content delivery/distribution system 102 may transmit one or more media signals containing digital and/or analog media content information to a reference site 108 and at least one monitored site 110 via respective communication paths or links 112 and 114.

The communication paths or links 112 and 114 may include any combination of hardwired or wireless links such as, for example, satellite links, wireless land-based links, cable links, the Internet, etc. The signals conveyed via the links 112 and 114 may contain multi-program analog signals and/or digital data streams, which are commonly employed with existing broadcast systems as well as other types of media content delivery/distribution systems.

As shown in FIG. 1, the reference site 108 may include a plurality of receivers (e.g., set-top boxes or the like) 116, 118 and 120 that simultaneously demodulate, demultiplex and/or decode audio, video and/or other information received via the communication link 112 from the content delivery/distribution system 102. In one example, each of the receivers 116, 118 and 120 receives audio information associated with a different portion of the media content (e.g., a different program) that is currently being transmitted (e.g., broadcast) and provides the audio information to a reference site processor 122. For example, the receiver 116 may provide audio information associated with a first program while the receivers 118 and 120 provide audio information associated with respective second and third programs. In any case, the reference site processor 122 is configured to control and/or has information indicating to which portion of the media content (e.g., which channel, program, etc.) conveyed via the link 112 each of the receivers 116, 118 and 120 is currently tuned.

In general, the reference site processor 122 includes the apparatus and methods described herein for collecting or generating reference signature information for a plurality of simultaneously broadcast programs. The reference site processor 122 sends the generated or collected reference signature information to a central processing facility 124 via a communication link 126. In turn, the central processing facility 124 may store the reference signature information in a database 130 and, as described in greater detail below, may process the reference signature information together with information received from the reference site processor 122 to generate information related to the consumption of media content.

The monitored site 110 could be, for example, a statistically selected home, business, etc. containing a television, a radio, a computer, etc. However, it should be recognized that, while the monitored site 110 is depicted in FIG. 1 as receiving media content from a remotely situated content delivery/distribution system 102 (e.g., a broadcast station) via the communication link 114, the monitored site 110 may alternatively or additionally receive media content from one or more local media content delivery systems or devices 128. The local sources 128 may include one or more DVRs, DVD players, VCRs, etc. In addition, while the example system 100 shown in FIG. 1 depicts a single monitored site (i.e., the monitored site 110), multiple monitored sites may receive media content via the link 114 and may be communicatively coupled to the central processing facility 124.

Figure 2:
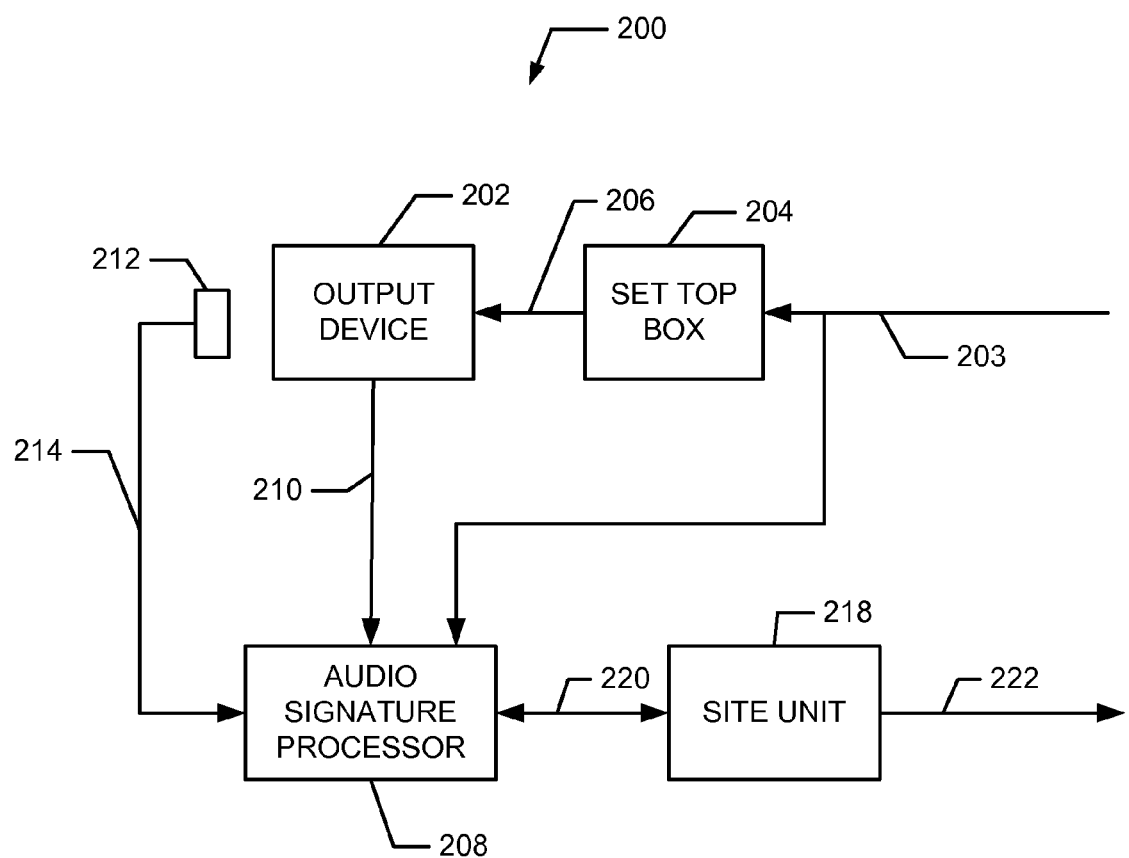
FIG. 2 is a block diagram of an example system that may be used to implement the monitored site of FIG. 1.

FIG. 2 is a block diagram of an example system 200 that may be used to implement the monitored site 110 of FIG. 1. As shown in FIG. 2, the example system 200 includes a media delivery, presentation or output device 202 such as, for example, a television or a video monitor that receives a media content signal 203, which may be derived directly or indirectly via the communication link 114 of FIG. 1. For example, the media content signal 203 may be provided by a low noise block coupled to a satellite receiving dish in the case where the link 114 is a satellite communication link. A receiver, decoder or set-top box 204 may be serially interposed between the media content signal 203 received via the link 114 and the output device 202. For example, in the case where the media content signal 203 received via the link 114 is a digital satellite or cable television transmission, the set-top box 204 demodulates the broadcast signal, demodulates multi-program data streams and selectively parses video and/or audio data packets associated with a desired channel and/or program. The selected data packets are processed to form an output signal 206 that can be processed and output (e.g., played, displayed, or otherwise presented) by the output device 202. For example, in the case where the output device 202 is a television, the output signal 206 may be a composite video signal, a component video signal, an S-video signal, a red, green, blue (RGB) signal, a digital visual interface (DVI) signal, a high definition multimedia interface (HDMI) signal, or any other displayable or renderable video signal applied to the appropriate input(s) of the output device 202. In the case where the media content signal 203 received via the link 114 is a conventional analog television transmission or signal, the set-top box 204 may not be required and the media content signal 203 may be directly coupled to the output device 202 (e.g., directly coupled to UHF/VHF inputs). In addition to signal processing functions, the set-top box 204 may also perform access control functions such as, for example, determining the media content to which a user of the example system 200 is permitted access to based on subscription status or subscription information associated with the example system 200, generating displayable program guide information, etc.

The example system 200 also includes an audio signature processor 208 that may be configured to perform audio signature collection or generation, comparison and/or signature match detection functions to identify the media content (e.g., what channel, program, etc.) presented or delivered by the output device 202. More specifically, the audio signature processor 208 receives the media content signal 203 and an audio output signal 210, which may be provided directly by the output device 202. The audio output signal 210 contains audio information associated with the media content currently consumed via or presented by the output device 202. For example, in the case where the media content signal 203 received via the link 114 is delivered via a broadcast signal, the audio information provided by the audio output signal 210 may be associated with a television channel or program to which the example system 200 is currently tuned. Alternatively, the audio signature processor 208 may be coupled to an acoustic transducer 212 such as, for example, a microphone that is proximate to an acoustic output device (e.g., a speaker) associated with the output device 202. In that case, the acoustic transducer 212 supplies an audio output signal 214 containing information associated with the media content currently presented by the output device 202 instead of, or in addition to, the audio output signal 210.

As described in greater detail below, the audio signature processor 208 generates media content signature information, and may also collect or generate reference signature information from the media content signal 203 received via the link 114. In some examples, the audio signature processor 208 sequentially generates reference signatures for programs, channels or, more generally, media content extracted or otherwise derived from the media content signal 203 and compares the reference signatures to the signature information associated with the media content currently being consumed via the output device 202. If the comparison of reference signature information to the signature information associated with the media content currently being consumed yields at least a substantial match, the audio signature processor 208 may identify the media content currently being consumed as the media content (e.g., the channel or program) associated with the reference signature information to which the currently viewed media content signature information is substantially matched.

The audio signature processor 208 is coupled to a site unit 218 via a communication link or connection 220. The audio signature processor 208 periodically or continuously sends consumption information (e.g., media content, channel and/or program information) associated with media content presented by or consumed via the output device 202 to the site unit 218. In turn, the site unit 218 processes the consumption information it receives from the audio signature processor 208 and sends, for example, consumption records or information to a central facility such as, for example, the central processing facility 124 of FIG. 1, via a communication link 222. The communication link 222 may include one or more wireless communication links (e.g., cellular, satellite, etc.), hardwired communication links (e.g., phone lines), or any other combination of communication hardware and technology platforms that employ any desired combination of communication protocols.

While FIG. 2 depicts the audio signature processor 208 as being located at a monitored site, some or all of the functions of the audio signature processor 208 can be distributed among a plurality of physical locations. For instance, as discussed in greater detail in connection with the example system shown in FIG. 4 below, the reference signature generation function, the signature comparison function and/or the signature match detection function may be performed by different physical systems, some or all of which may be located in different physical locations.

Figure 3:
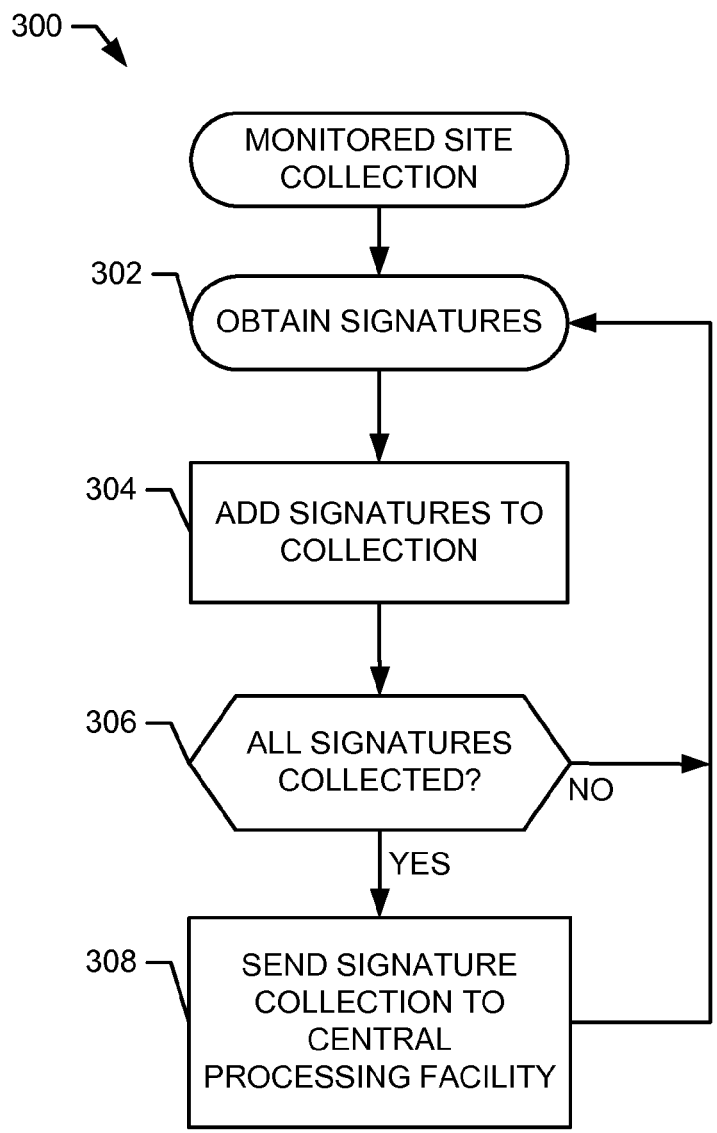
FIG. 3 is a flow diagram illustrating an example method to generate and collect signatures.

FIG. 3 is a flow diagram illustrating an example method 300 to generate and collect signatures. The example method 300 may be executed by the example monitored site 200 of FIG. 2 to generate and collect signatures. Initially, the audio signature processor 208 of FIG. 2 obtains (e.g., generates, collects, etc.) signatures or signature information from a plurality of signals (e.g., the audio output signals 210 and/or 214, and the media content signal 203) (block 302). As described in greater detail in connection with FIG. 5 below, the signatures output by the audio signature processor 208 are sent to the site unit 218 of FIG. 2 via the communication link or connection 220 of FIG. 2. The site unit 218 adds the signatures, received from the audio signature processor 208, to a collection of signatures (block 304). Such a collection of signatures may be implemented using a database file, a text file, a serialized data structure, or one (or any combination) of many well-known data storage mechanisms or techniques. The signatures stored in the collection may be time stamped and stored along with other consumption information such as, for example, channel numbers, program identification information, etc.

If the site unit 218 determines that all the required signatures have not been collected (block 306), the site unit 218 returns control to the audio signature processor 208 and waits for the additional signatures to be obtained (block 302). On the other hand, if the site unit 218 determines that all required signatures have been collected (block 306), the site unit 218 sends the collection of signatures to the central processing facility 124 of FIG. 1 via the link 222 of FIG. 2 (block 308). The site unit 218 may determine at block 306 whether all signatures have been collected by using a time limit, such as a number of minutes, hours, days, weeks, months, etc, to delimit when all signatures that have been collected are ready to be sent to the central processing facility 124. After sending the collection of signatures at block 308, the site unit 218 may return control to block 302 and continue to obtain additional signatures.

While FIG. 3 depicts an example manner by which signatures are collected or generated for a period of time and then sent in groups to the central processing facility 124, other manners of conveying signature information to the central processing facility 124 may be used instead. For example, signatures may be collected and conveyed to the central processing facility 124 on a continuous basis (e.g., on a streaming basis) rather than in groups sent on a periodic basis. However, any other suitable manner of conveying signatures may be used instead. Additionally, as noted above in connection with FIG. 1, the central facility 124 may perform statistical analyses using the collected signatures to derive media content consumption behavior information, or any other desired information, therefrom.

Figure 4:
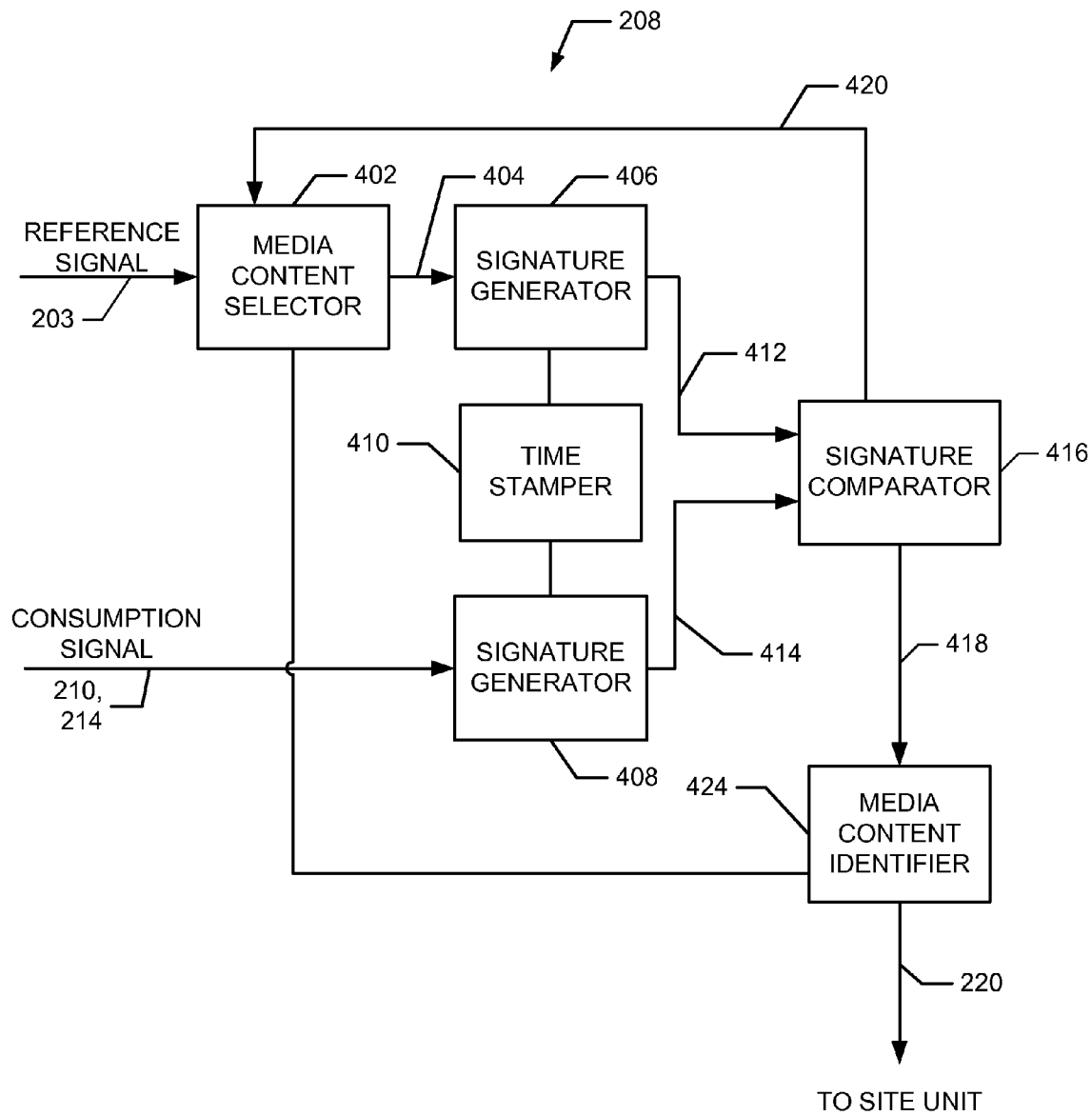
FIG. 4 is a block diagram illustrating an example manner in which the audio signature processor of FIG. 2 may be implemented.

FIG. 4 is a more detailed block diagram that illustrates an example manner in which the audio signature processor 208 shown in FIG. 2 may be implemented. The example audio signature processor 208 of FIG. 4 includes a media content selector 402 (e.g., a scanning tuner) that receives the media content signal 203 (e.g., the reference signal), which may contain a plurality of channels and audio and/or video programs available for consumption (e.g., viewing, listening, etc.), and selects a portion of the media content contained therein (e.g., a channel, program, etc.) for further processing. In particular, in the case where the media content signal 203 is a multi-program analog signal, the media content selector 402 may vary a demodulator mixing frequency to selectively tune to particular channels and programs. On the other hand, if the media content signal 203 is a multi-program digital data stream, the media content selector 402 may include digital receiver functions that demodulate, demultiplex and selectively parse the data stream to extract audio and/or video data packets associated with particular channels or programs. In either case, the techniques for processing such multi-program analog signals and digital signals are well known and, thus, are not described in greater detail herein.

In general, the media content selection process performed by the media content selector 402 results in the sequential generation of signature information for a plurality of channels and/or media programs. Also, generally, the media content selection process (as described in greater detail below in connection with FIG. 5) continues until the audio signature processor 208 determines that a substantial match has been identified (i.e., that the media content currently being consumed via the output device 202 of FIG. 2 can be identified with a relatively high degree of certainty), or until the audio signature processor 208 determines that a substantial match cannot be identified (e.g., all available media content has been selected, processed to form audio signatures and none of those audio signatures substantially matches the signature information of the media content currently being consumed). In one example, the media content selection performed by the media content selector 402 may be based on a predetermined numerical sequence (e.g., a sequence of channel numbers or program numbers). In another example, the media content selection may be based on a probability of matching. For example, the media content selector 402 may select channels associated with recently consumed media content. Additionally or alternatively, the media content selector 402 may select channels based on the historical frequency with which media content has been consumed via those channels.

The media content selector 402 outputs a media content signal 404 to a signature generator 406. The media content signal 404 contains audio information associated with the media content currently selected by the media content selector 402. The signature generator 406 processes the received audio information to generate audio signature information therefrom. As described in greater detail below, the signature generator 406 uses one or more characteristics (e.g., peak magnitudes, zero crossings, temporal characteristics) of one or more audio features of the signal 404 to generate signatures or signature information.

The example signature generator 406 uses the signal 404 to generate a signature characteristic of the signal 404. To this end, the example signature generator 406 identifies signals peaks and zero crossings in each of several time intervals of the signal and sums the magnitudes of the signal peaks. The signature generator 406 then generates a curve based on the interval sums, smoothes the curve, and generates a signature by generating a normalized curve feature (e.g., triangular-shaped peak) at a temporal location of identified peaks in the smoothed curve, each of which has a normalized height (i.e., magnitude) and width. The signature has a height of zero at locations other than the normalized curve features. The resulting signatures are substantially uniquely characteristic of the media content contained within the signal 404 and, thus, may be used as a reference to compare the media content currently selected by the media content selector 402 to the media content currently being consumed by an audience member (e.g., via the audio output signals 210 and 214).

A second signature generator 408 receives an audio output signal from the output device 202 (e.g., the audio output signal 210 or, alternatively, the signal 214 from the acoustic transducer 212). As described above, the signals 210 and 214 are associated with or representative of the media content being presented by or consumed via the output device 202. The signature generator 408 is substantially the same or identical to the signature generator 406 and, thus, generates audio signatures or information in a substantially similar or identical manner to that of the signature generator 406.

A time stamper 410 may be configured to provide time stamps that are used by the signature generators 406 and 408 to time stamp signature data generated thereby. For example, each signature may have one or more time stamps associated therewith to facilitate subsequent signature comparison operations, correlation operations, matching operations, etc. In some examples, the time stamper 410 may generate relatively fine time intervals such as, for example, $1/64^{th}$ of one second increments, each of which may correspond to an absolute time or a relative time based on some reference time.

The signature generators 406 and 408 provide respective collections of signatures or signature information 412 and 414 to a signature comparator 416. The signature comparator 416 compares the signature information 412 associated with or generated from the signal 404 to the signature information 414, which is associated with or generated from one or both of the signals 210 and 214. As noted above, the signal 404 contains audio information associated with the media content (e.g., the channel, program, etc.) currently selected by the media content selector 402 from the media content signal 203, and the signals 210 and 214 contain audio information associated with the media content currently being consumed via the output device 202.

The comparison of audio signatures or information can be performed using any known or desired technique. In one example, the signature comparator 416 performs a normalized correlation between the reference signature information 412 and the signature information associated with the media content currently being consumed (i.e., the signature information 414) over a predetermined interval or time period. If the result of the correlation is greater than or equal to a predetermined and/or dynamically determined threshold, the signature comparator 416 may provide an output signal or information 418 indicating that at least a substantial match has been detected (i.e., that the known media content currently selected by the media content selector 402 is substantially similar or identical to the media content currently being consumed via the output device 202).

In another example, the signature comparator 416 calculates a difference signal or an error signal and then calculates an average error, a peak or maximum error, a standard deviation of error, or any other parameters characteristic of the differences, if any, between the signature information 412 and 414. One or more of those parameters or characteristics may be compared to one or more threshold values and a determination of whether a substantial match or an identical match exists is indicated via the output 418 based on whether those parameters or characteristics are less than or greater than one or more of the threshold values.

The signature comparator 416 may also provide a feedback signal or information 420 to the media content selector 402 to facilitate the selection of media content (e.g., channels, programs, etc.) from the reference media content signal 203. For example, in the event that the signature comparator 416 determines that the signature information 412 and 414 are not substantially similar or identical (i.e., the media content currently selected or tuned from the reference or media content signal 203 by the media content selector 402 does not substantially match the media content currently being consumed via the output device 202), the feedback signal 420 may indicate a non-match condition to the media content selector 402. In turn, the media content selector 402 may select or tune the next portion of media content (e.g., a next channel or program) in its media content search or scan sequence.

A media content identifier 424 is coupled to the audio signature comparator 416 and receives the match information output 418. If the media content identifier 424 receives information (via the output 418) indicating that a substantial or identical match has been identified, the media content identifier 424 determines the identity of the media content currently being consumed via the output device 202. More specifically, the media content currently being consumed via the output device 202 may be identified as a particular broadcast channel, program, website, etc.

The media content identifier 424 is coupled to the site unit 218 (FIG. 2) and provides the media content identification information to the site unit 218 (FIG. 2) via the communication link 220. The site unit 218 may use the media content identification information provided by the media content identifier 424 to generate consumption records and the like.

Figure 5:
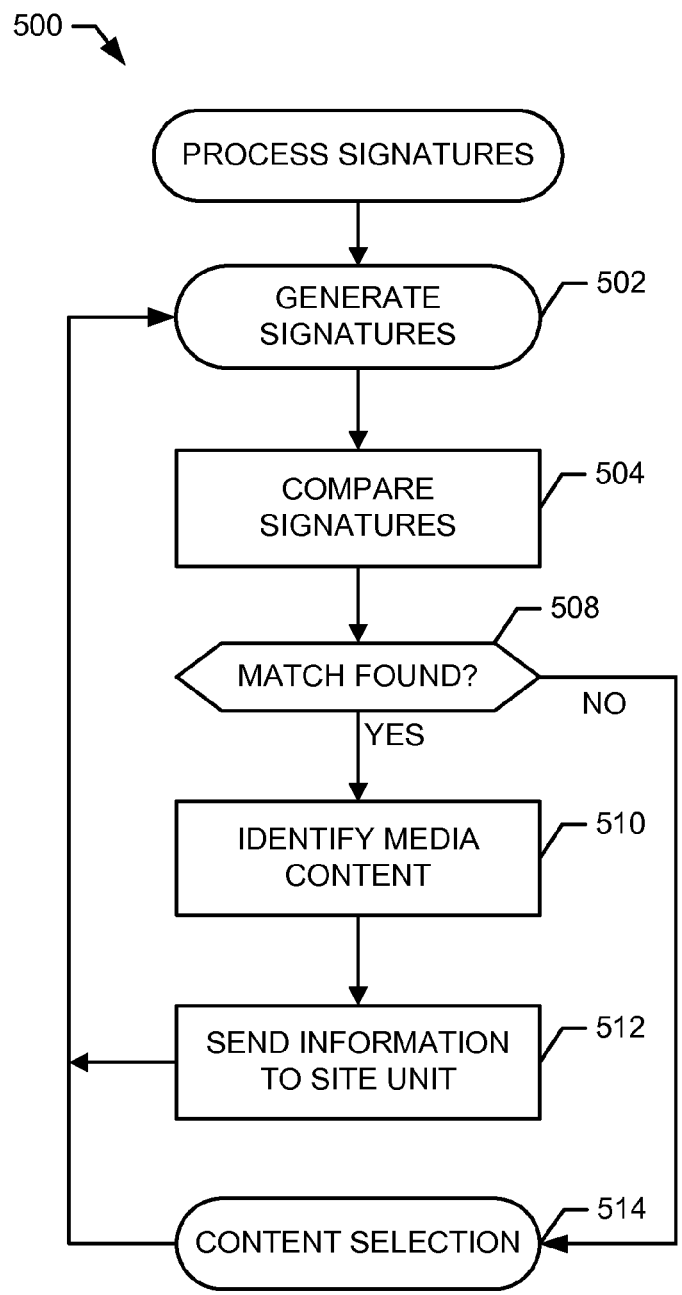
FIG. 5 is a flow diagram illustrating an example method to process audio signatures.

FIG. 5 is a flow diagram illustrating an example method 500 to process audio signatures. Initially, the signature generators 406 and 408 (FIG. 4) collect or generate signatures and send the signatures to the signature comparator 416 (FIG. 4) (block 502). As described in greater detail in connection with FIG. 7 below, the signature collection or generation process (block 502) may use the characteristics of audio features such as, for example, temporal characteristics such as the temporal locations of signal peaks, zero crossings of the signal, and signal peak magnitudes.

The signature comparator 416 then compares signature information received from the signature generator 406 to signature information received from the signature generator 408 (block 504).

An example audio signal may be divided into a plurality of successive time intervals, each of which may be an equal or unequal number of seconds, minutes, etc. Signatures may be generated within the confines of these time intervals or sampling periods to facilitate efficient matching of signatures. For example, one signature per second may be generated. In such a case, a matching process can match a reference signal signature (e.g., a signature derived from the media content signal 203 of FIG. 4) generated within a time interval (e.g., a one second interval) to a consumption signal (e.g., one or both of the signals 210 and 214) signature generated within that same time interval. Alternatively or additionally, the signature matching algorithm can match the reference signal signature generated within a predetermined time interval to signatures generated for one or both of the consumption signals 210 and 214 of FIG. 4 over a plurality of time intervals.

Regardless of the particular signature matching technique employed by the signature comparator 416 of FIG. 4, if the signature comparator 416 determines that a signature received from the signature generator 406 of FIG. 4 matches (either substantially or identically) a signature received from the signature generator 408 (block 508), the signature comparator 416 conveys the matching information 418 to the media content identifier 424 of FIG. 4. In turn, the media content identifier 424 identifies the media content (e.g., the channel, program, etc.) to which the media content selector 402 of FIG. 4 is currently tuned and, thus, the media content currently being consumed via the output device 202 of FIG. 2 (block 510). For example, if the signature comparator 416 and the media content identifier 424 are implemented using separate processor-based systems, the signature comparator 416 may convey an interrupt to the media content identifier 424. Alternatively, if the signature comparator 416 and the media content identifier 424 are implemented within the same processor-based system, a software function call may be used to indicate to the media content identifier 424 that a matching condition has occurred within the signature comparator 416. After the media content has been identified (block 510), the media content identifier 424 sends the signatures or signature information along with any other desired media content identification information (e.g., program identifiers, time stamps, etc.) to the site unit 218 of FIG. 2 via the communication link or connection 220 (block 512).

On the other hand, if at block 508 the signature comparator 416 determines that a signature received from the signature generator 406 does not match a signature received from the signature generator 408, the signature comparator 416 transfers control to block 514 to invoke a media content selection process, which is described in greater detail in connection with FIG. 6. After the media content selector 402 performs the media content selection process at block 514, control returns to block 502, at which the signature generators 406 and 408 again generate signature information or signatures.

Figure 6:
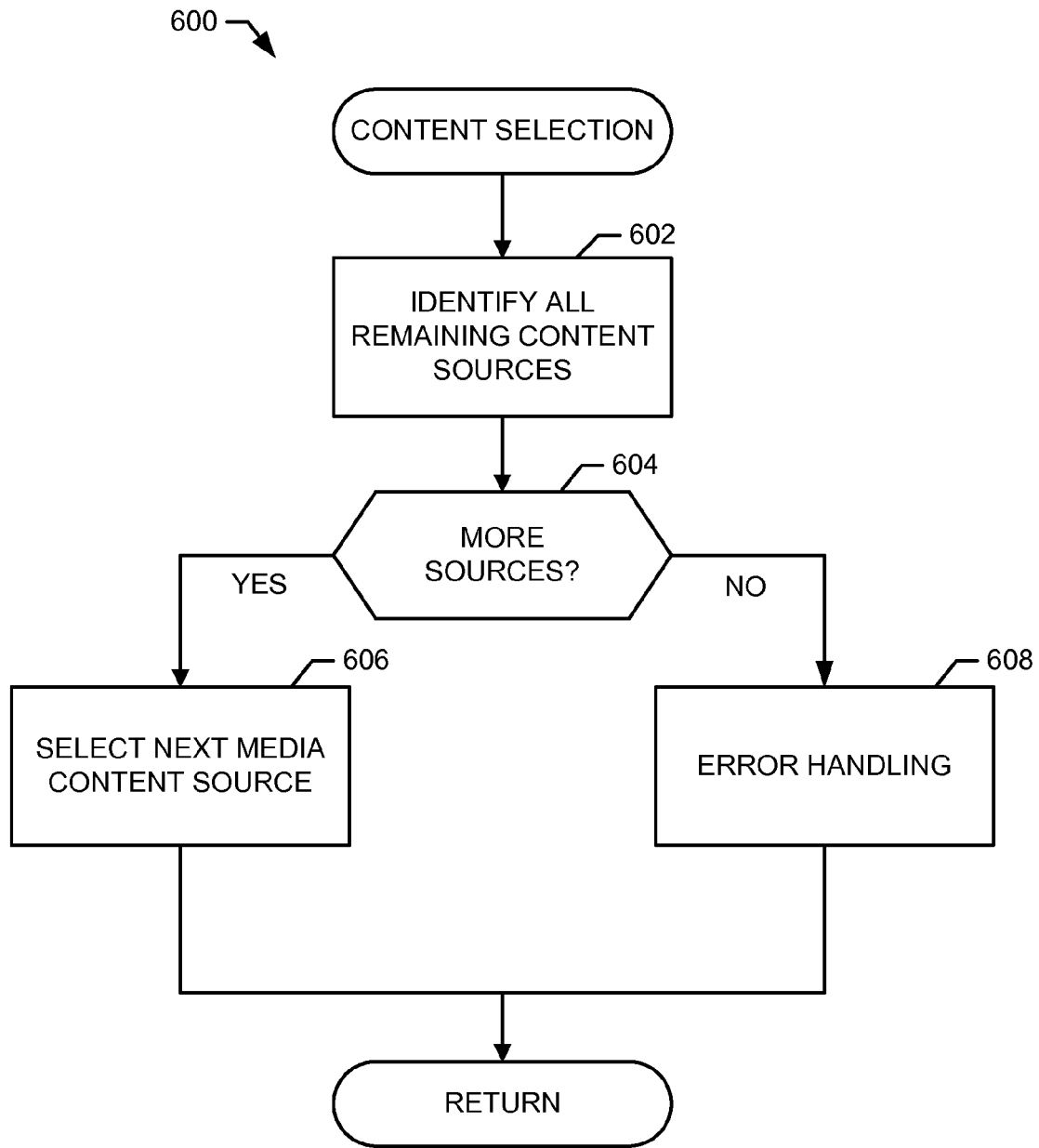
FIG. 6 is a flow diagram illustrating an example method to select media content.

FIG. 6 is a flow diagram illustrating an example method 600 to select media content. Initially, the media content selector 402 of FIG. 4 identifies all media content portions (e.g., channels, programs, etc.) that have not yet been compared to the signal(s) (e.g., the signals 210 and 214) that are associated with the media content currently being consumed via the output device 202 of FIG. 2 (block 602). If the media content selector 402 determines that the reference media content signal 203 contains media content that has not yet been compared to the consumption signal 210, 214 (block 604), the media content selector 402 selects another portion of media content (e.g., tunes to another broadcast channel or program) (block 606) and then returns control to block 502 of FIG. 5 to generate a signature of the selected media content. The media content selector 402 may, for example, determine if broadcast channels exist that have not yet provided media content for comparison to the consumption signal (e.g., the signals 210 and 214) by scanning or searching a series of broadcast channels in a predetermined sequence. If the media content selector 402 determines at block 604 that all of the media content supplied on each of the available broadcast channels has already been compared to the media content currently being consumed (e.g., the signals 210 and 214), the media content selector 402 may perform one or more error handling techniques (block 608) and then return control to block 502 of FIG. 5.

Figure 7:
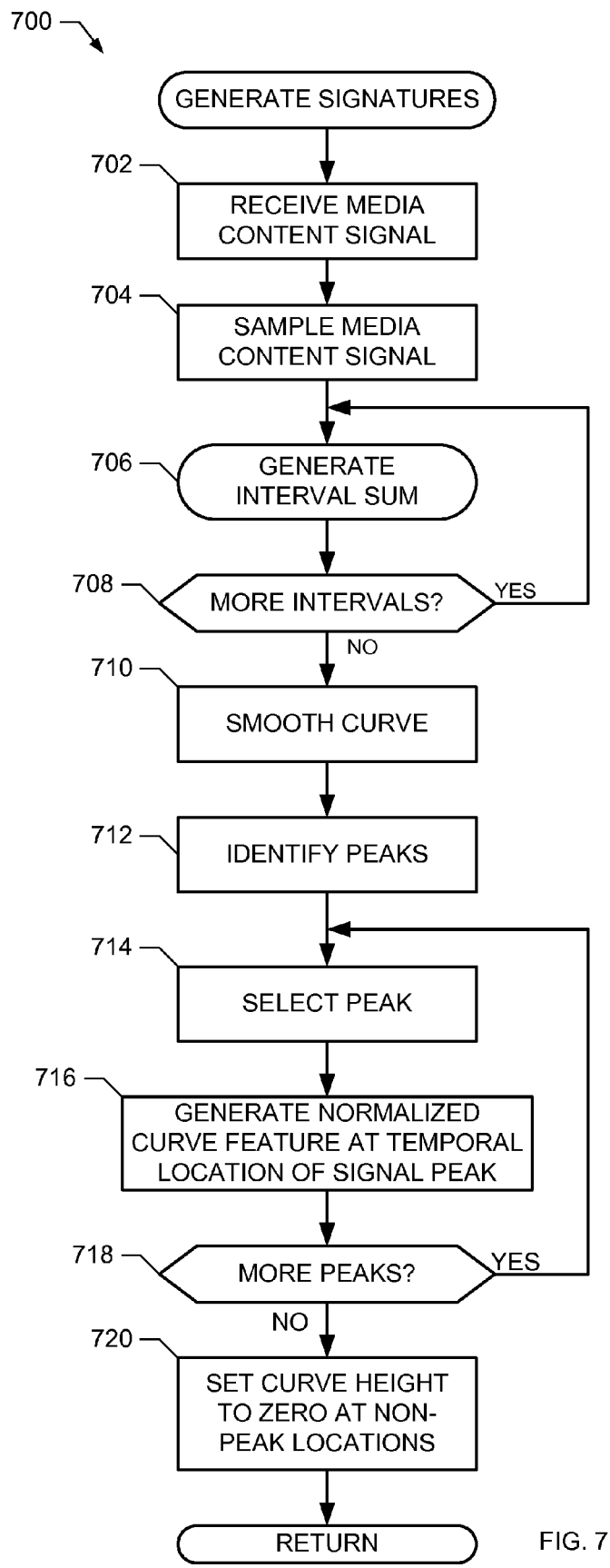
FIG. 7 is a flow diagram illustrating an example method to generate signatures.

FIG. 7 is a flow diagram illustrating an example method 700 to generate signatures. The example method 700 may be executed by the example audio signature processor 208 of FIG. 4 to implement block 502 of the example method 500 of FIG. 5. For clarity and brevity, this example will refer to the signature generator 408 generating a signature for the consumption signal 210 or 214. However, the example method 700 may also be implemented by the signature generator 406 to generate reference signatures for signals received from the media content selector 402.

The signature generator 408 receives a media content signal (i.e., the consumption signal 210, 214) for which a signature is to be generated (block 702). While receiving the media content signal, the signature generator 408 samples the media content signal to generate a digital representation of the signal (block 704). Block 704 may be omitted if, for example, the media content signal is received in digital format in block 702. After sampling the signal (if necessary), the signature generator 408 generates an interval sum for each of multiple intervals of the media content signal (block 706). For example, a media content signal may be sampled at 8000 samples per second (block 704). The signature generator 408 then creates signal intervals every $1/64^{th}$ of one second, using 125 samples per interval. As described in detail below in FIG. 8, the generated interval sum is based on peak magnitudes and zero crossings of the samples in the corresponding interval. After generating the interval sum (block 706), the signature generator 408 determines whether there are more intervals in the media content signal (block 708). If there are more intervals (block 708), control returns to block 706 to generate another interval sum.

If there are no more intervals (block 708), the signature generator 408 smoothes the curve represented by the interval sums generated in block 706 (block 710). For example, the signature generator 408 may perform a low pass filter function to eliminate noise and other spurious interference or signal components that may adversely affect signature match detection. One particularly useful smoothing function may be based on the formula $y(t)=a*x(t)+b*y(t-1)$, where y represents the smoothed data, x represents the interval sum data generated in block 706, and $a+b=1$. Preferably, $a=b=0.5$. However, a and b may be different values if desired to suit the needs of a particular application. A smoothing function such as the example function set forth above may be successively applied to the data multiple times (e.g., ten times) to achieve a desired smoothness.

The signature generator 408 then identifies the peaks (e.g., peak amplitude) in the smoothed curve (block 712). For example, the signature generator 408 determines the temporal locations of the peaks in the smoothed curve and the associated magnitudes of the peaks. The signature generator 408 may use any technique to determine the peaks of the curve. When the peaks have been identified (block 712), the signature generator 408 selects an identified peak (block 714) and generates a normalized curve feature at the temporal location of the selected peak (block 716). An example normalized curve feature represents a triangular-shaped peak having a width and a height, with the peak or apex of the triangle at the temporal location of the peak identified in block 712. The signature generator 408 determines whether there are more peaks (block 718) and, if so, returns control to block 714 to select another identified peak. The signature generator 408 continues to execute blocks 714-718 for each peak identified at block 712. The example triangular-shaped peaks or curve features generated by the signature generator 408 at block 716 are substantially identical and, thus, have equal or substantially equal widths and heights.

When the signature generator 408 has generated normalized curve features for each identified peak (blocks 714-718), the signature generator 408 sets the height of the signal curve to zero at all temporal locations that do not correspond to a signal peak (block 720). Thus, the signal curve generated by the signature generator 408 resembles a series of triangular-shaped peaks having equal or substantially equal widths and heights regardless of the amplitude of the original signal peaks to which they correspond. After generating the signature, the example method 700 ends and control returns to block 504 of FIG. 5 to compare the generated signatures.

Figure 8:
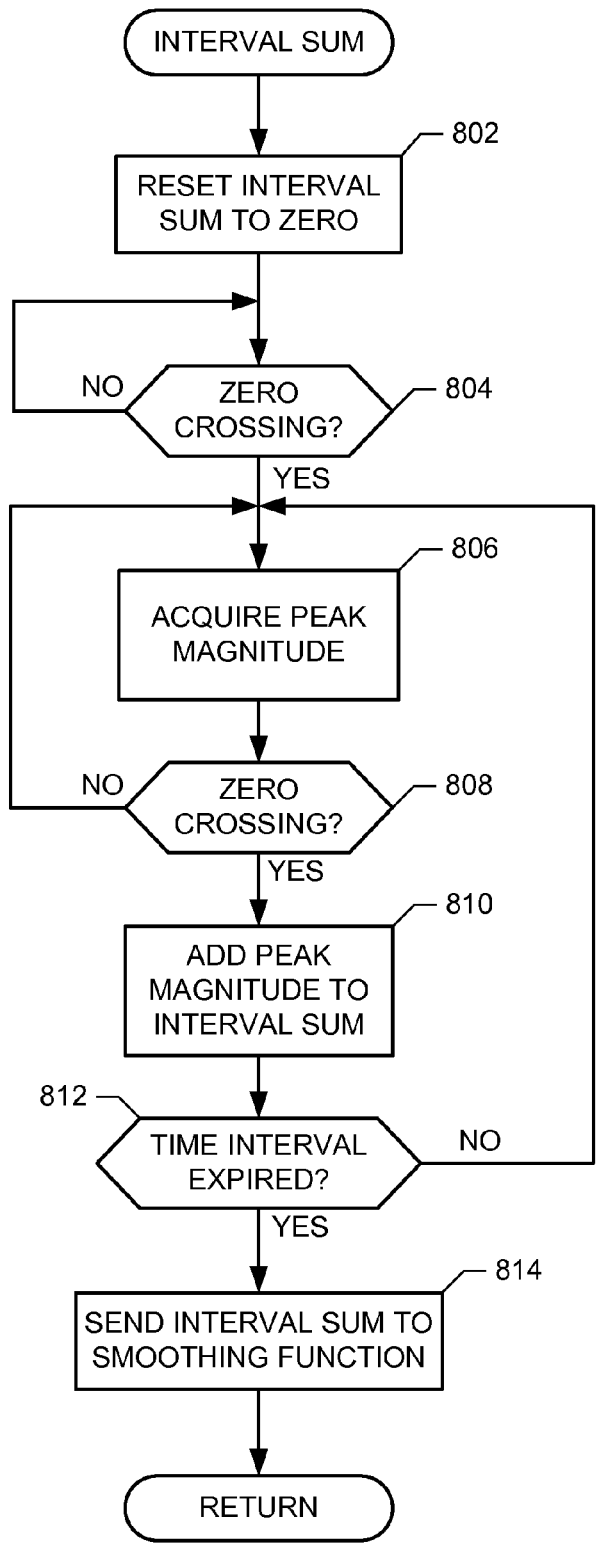
FIG. 8 is a flow diagram illustrating an example method to generate an interval sum.

FIG. 8 is a flow diagram illustrating an example method 800 to generate an interval sum. The example method 800 may be used to implement block 706 of the example method of FIG. 7. In the example implementation, the method 800 is called from block 704 after the signature generator 408 of FIG. 4 samples the received media content signal, or from block 708 when the signature generator 408 determines there are more intervals for which to determine an interval sum.

Initially, the signature generator 408 resets a sample interval sum to zero (block 802) and then waits for a zero crossing of the audio signal for which a signature is to be generated (e.g., the example consumption signal 210 or 214, the example reference signal 404) (block 804). Upon detection of a zero crossing (block 804), the signature generator 408 continuously or periodically acquires the peak magnitude of the signal (block 806) until a subsequent zero crossing is detected (block 808). After the subsequent zero crossing is detected (block 808), the example signature generator 408 adds the peak magnitude acquired at block 806 to an interval sum (block 810). The signature generator 408 then determines if the sample interval has expired (e.g., a predetermined amount of time has elapsed, a predetermined number of samples have been acquired, etc.) (block 812). The sample interval may be a predetermined amount of time during which peak magnitudes are summed. If the sample interval has not expired (block 812), the signature generator 408 returns control to block 806 to continue to acquire the peak magnitude. On the other hand, if the sample interval has expired (block 812), the signature generator 408 sends the current interval sum to a smoothing function (block 814) and then returns control to block 708 of the example method 700 of FIG. 7 to determine whether there are more intervals in the sampled media content signal.

Figure 9:
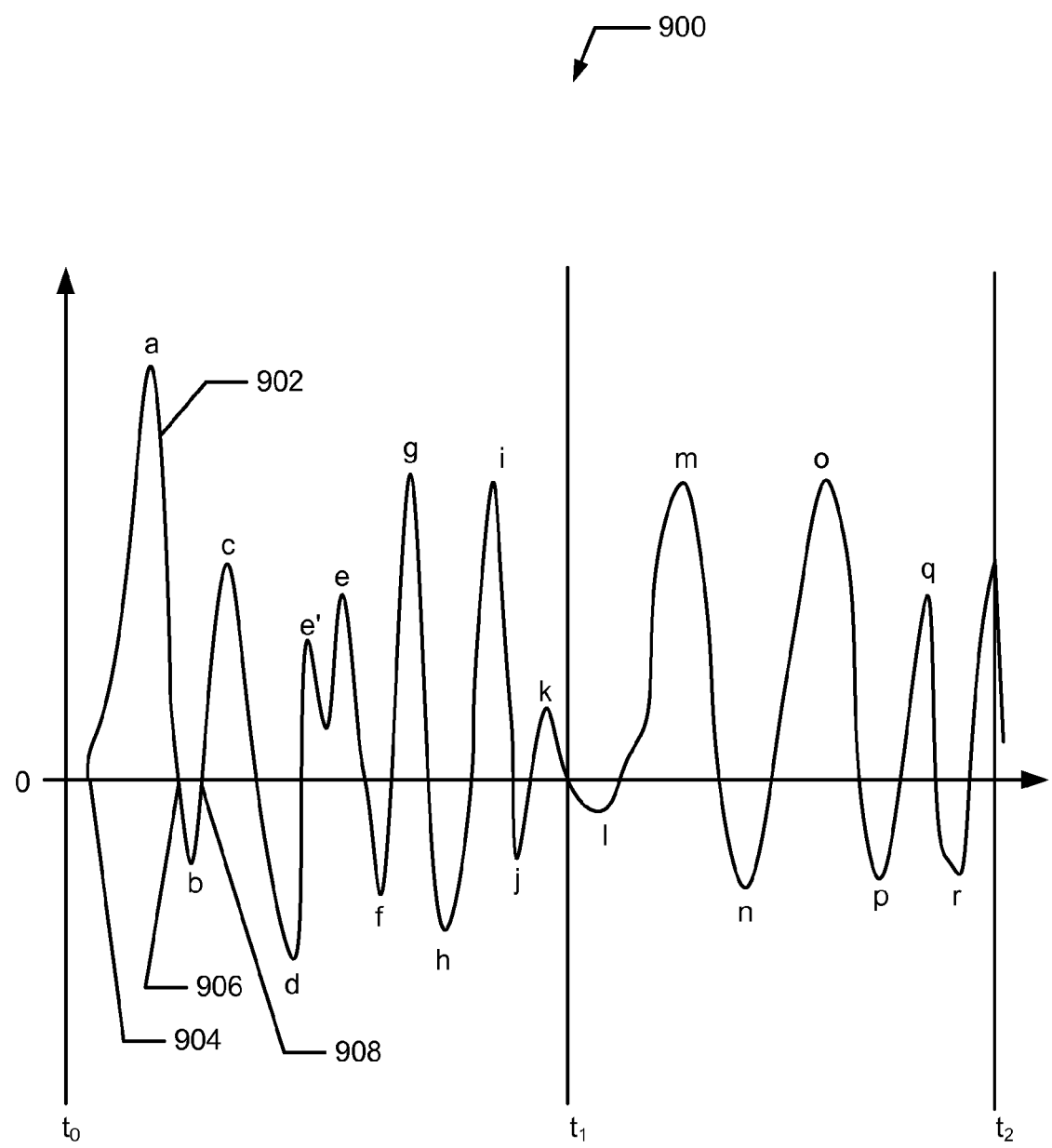
FIG. 9 is an example graph that depicts an audio signal that may be processed by the example signature generator shown in FIG. 4.

FIG. 9 is an example graph 900 that depicts an audio signal 902 that may be processed by the example signature generator 406 or the example signature generator 408 shown in FIG. 4. The described example of FIG. 9 will refer to the signature generator 408. The signal 902 may be provided as the consumption signal 210 or 214 to the signature generator 408. The signal 902 may additionally or alternatively be provided as the reference signal 404 to the signature generator 406 of FIG. 4.

By way of example, at a time to the interval sum retained by the signature generator 408 is reset to zero. Then, at a first zero crossing 904, the signature generator 408 resets the peak value to zero. Following the first zero crossing 904, the signal 902 increases in magnitude until it reaches a peak value "a." The signature generator 408 retains the peak value "a" while the signal 902 decreases between "a" and a second zero crossing 906. At the second zero crossing 906, the signature generator 408 adds the magnitude of the peak value "a" to the interval sum and then resets its retained peak value to zero. Following the second zero crossing 906, the signal 902 decreases in value until it reaches a negative peak "b," the absolute value of which is retained by the signature generator 408 as the signal 902 increases to zero at a third zero crossing 908. At the third zero crossing 908, the signature generator 408 adds the magnitude of "b" to the interval sum and resets the retained peak value to zero.

This process continues for peaks "d," through "k" up to time a $t_1$ (which may correspond to a predetermined time interval or sample interval including, for example, 125 samples), at which point the signature generator 408 stores the interval sum as a data point for later smoothing and resets the interval sum to zero. It should be noted that the peak "e" represents the peak magnitude between zero crossings and not "e' ("e" prime)".

The signature generator 408 repeats this process over the predetermined time interval, sample interval, or number of samples between times $t_1$ and $t_2$ for peaks "1" through "r," which results in a second sum being stored for smoothing. Of course, the process depicted graphically in FIG. 9 could be carried out for any desired number of intervals, which do not necessarily have to be immediately successive or contiguous. Further, in general, as the number of sums used to provide signature information for a particular audio signal increases, the certainty with which that signature uniquely identifies that particular audio signal increases.

Figure 10:
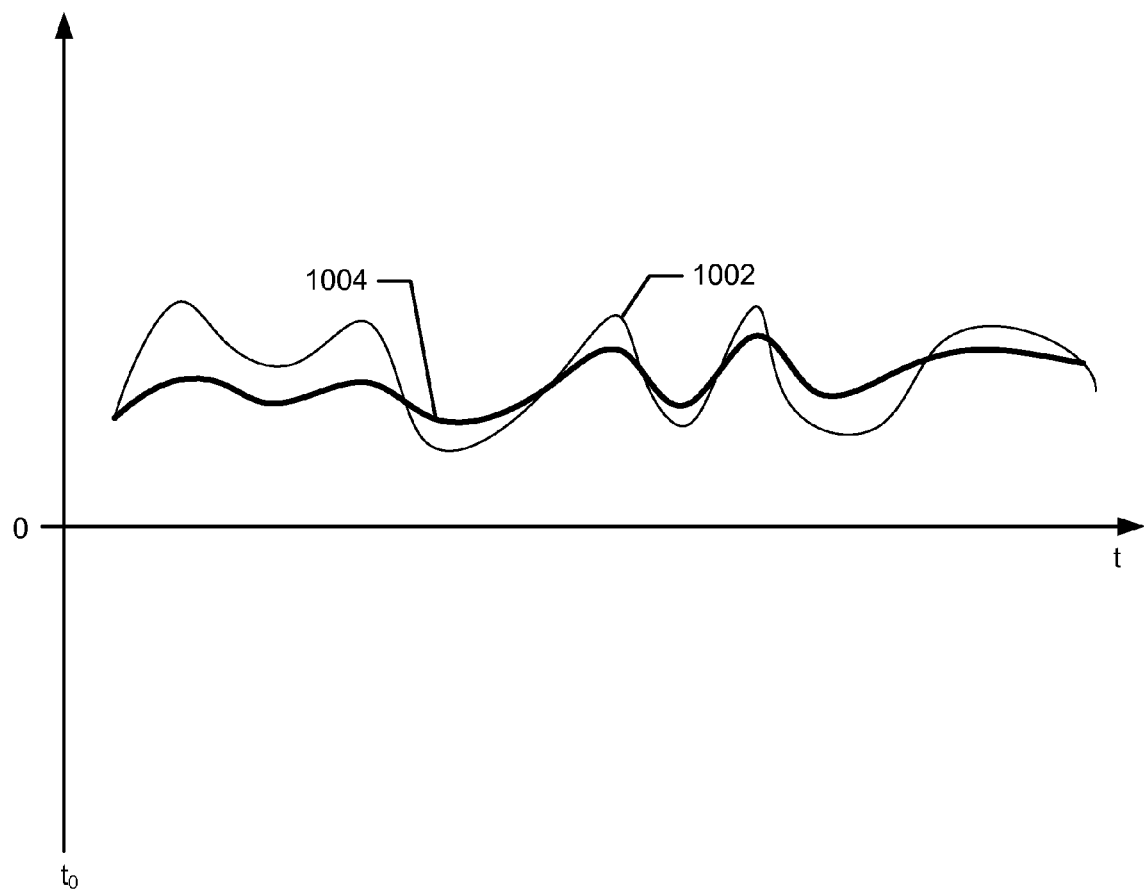
FIG. 10 illustrates an example graph that depicts zero crossing data that may be generated by the example signature generator of FIG. 4 from an audio signal.

FIG. 10 illustrates an example graph that depicts zero crossing data that may be generated by the example signature generator 408 of FIG. 4 from an audio signal such as, for example, the example signal 902 of FIG. 9. More specifically, the sequence of interval sums generated by the signature generator 408, which may be generally referred to as a zero crossing energy curve, is depicted at reference numeral 1002. Again, as noted above, in the case where the signal 902 is processed as a series of discrete data values, the zero crossing energy curve 1002 has fewer discrete data values in any given time period or sample period because a plurality of samples or peak magnitude values from the signal 902 are summed to form each data value making up the zero crossing energy curve 1002. In the case where 125 samples from the signal 902 are summed, a data reduction ratio of 125:1 (i.e., from the signal 302 to the zero crossing energy curve 1002) is realized. A data reduction ratio of 125:1, using the 8000 samples per second sampling rate described above yields a 64 sample per second zero crossing energy curve 1002. However, as noted above, any other data reduction ratio may be used instead. The zero crossing energy curve 1002 may then be processed by the signature generator 408 using a smoothing function to form a smoothed zero crossing energy curve 1004.

Figure 11:
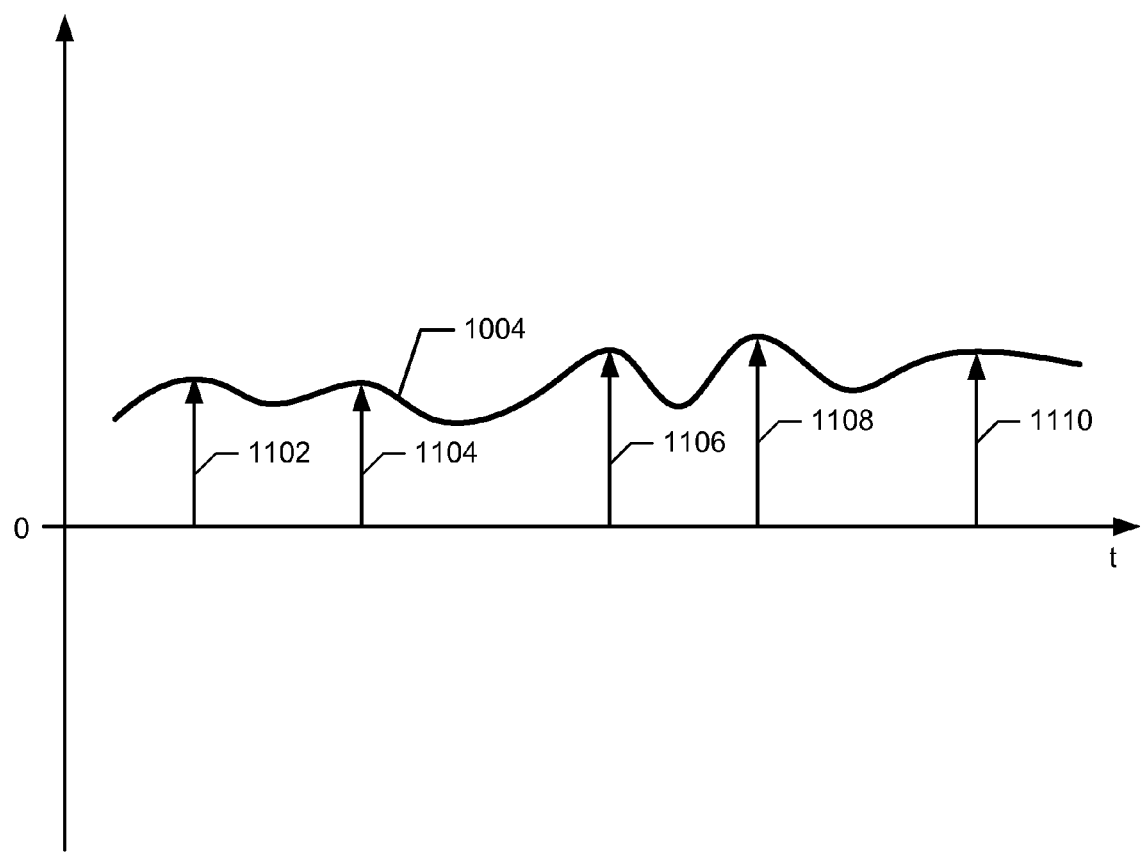
FIG. 11 illustrates the example smoothed zero crossing energy curve of FIG. 10 and peaks identified from the smoothed zero crossing energy curve.

FIG. 11 illustrates the example smoothed zero crossing energy curve 1004 of FIG. 10 and peaks identified from the smoothed zero crossing energy curve 1004. The example smoothed zero crossing energy curve 1004 includes peaks 1102, 1104, 1106, 1108, and 1110, which may be identified by the example signature generator 408 of FIG. 4. After smoothing the zero crossing energy curve 1002 of FIG. 10, the signature generator 408 identifies the peaks 1102-1110 formed by, for example, 500 samples at 64 samples per second.

Figure 12:
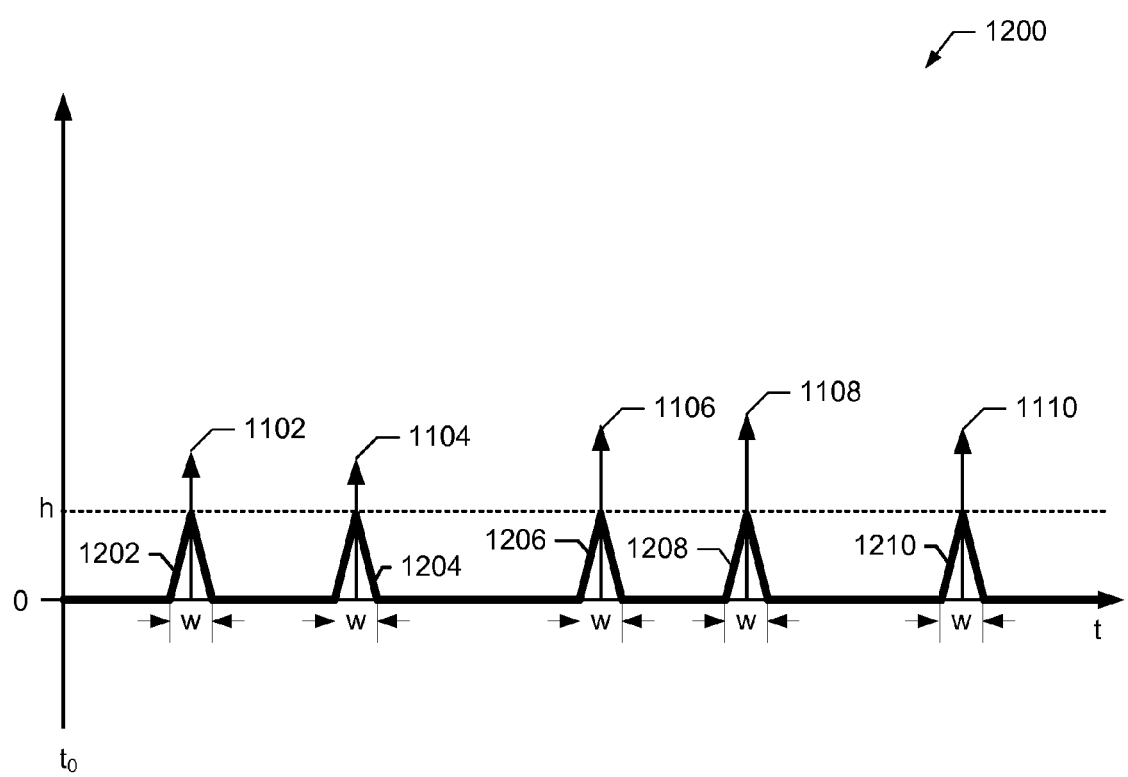
FIG. 12 illustrates an example signature generated by the audio signature processor of FIG. 4 utilizing the peaks illustrated in FIG. 11.

FIG. 12 illustrates an example signature 1200 generated by the audio signature processor 208 of FIG. 4 utilizing the peaks 1102-1110 illustrated in FIG. 11. The example signature 1200 includes normalized curve features 1202, 1204, 1206, 1208, and 1210 corresponding to respective signal peaks 1102, 1104, 1106, 1108, and 1110. The normalized curve features 1202-1210 may be generated by the signature generator 408 by executing the example method 700 described in FIG. 7 based on the example audio signal 900 of FIG. 9 and the zero crossing energy curve 1002 of FIG. 10.

As illustrated in FIG. 12, the normalized curve features 1202, 1204, 1206, 1208, and 1210 have equal heights h and equal widths w. Further, the center location of each of the example normalized curve features 1202-1212 is at the temporal location of the respective curve peaks 1102, 1104, 1106, 1108, and 1110. Additionally, the example signature 1200 has a height of zero at temporal locations other than those corresponding to normalized curve features. When the signature generator 408 has finished generating the example signature 1200 (e.g., via the example method 700 of FIG. 7), the signature comparator 416 of FIG. 4 compares the signature 1200 to known signatures to identify the example audio signal 900.

Although the example normalized curve features 1202-1210 of FIG. 12 have equal heights and widths, the normalized curve features 1202-1210 may be generated having, for example, heights equal to or proportional to the heights and/or temporal locations of the corresponding peaks, widths equal to or proportional to the heights and/or temporal locations of the corresponding peaks, and/or any combination thereof.

Figure 13:
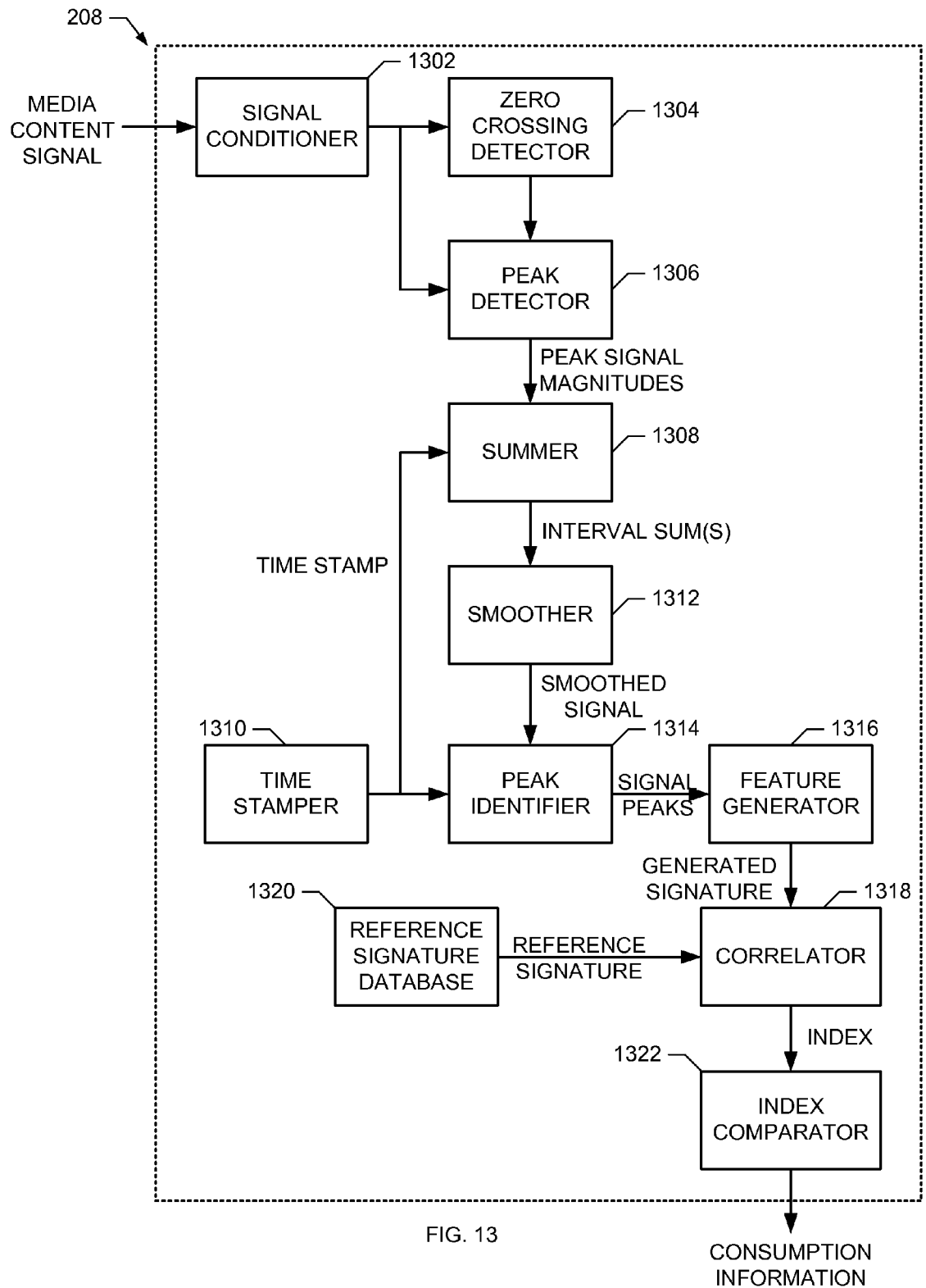
FIG. 13 is a block diagram of another example implementation of the audio signature processor of FIG. 2.

FIG. 13 is a block diagram of another example implementation of the audio signature processor 208 of FIG. 2. The example audio signature processor 208 receives a media content signal (e.g., the consumption signal 210 and/or 214 of FIG. 2, or the reference signal 404 of FIG. 4), identifies the media content signal, and outputs consumption information to the site unit 218 of FIG. 2. For ease of reference, the discussion of the example audio signature processor 208 of FIG. 13 will refer to the example consumption signal 210 of FIG. 2. However, other signals (e.g., the signal 214 of FIG. 2) could be processed by the audio signature processor 208.

The example audio signature processor 208 shown in FIG. 13 receives a media content signal (e.g., the audio output signal or reference signal 203, or the consumption signals 210 or 214 of FIG. 4), which is sent to a signal conditioner 1302. The signal conditioner 1302 may include analog and or digital circuitry for filtering (e.g., noise filtering, anti-aliasing filtering, transient filtering, etc.). One particularly useful filtering circuit may provide a bandpass filter characteristic from 300 hertz to 3000 hertz. Additionally or alternatively, the signal conditioner 1302 may include protection circuitry (e.g., surge protection circuitry), level shifting circuitry, amplification circuitry, attenuation circuitry, or any other known or desired signal conditioning circuitry. Of course, the signal conditioner 1302 may be eliminated from the audio signature processor 208 in the event that the media content signals provided to the audio signature processor 208 do not require conditioning.

Conditioned signal(s) output by the signal conditioner 1302 are provided to a zero crossing detector 1304 and a peak detector 1306. The zero crossing detector 1304 may use a one-shot multi-vibrator or the like to output a pulse to the peak detector 1306 each time a zero crossing occurs within the conditioned signal(s). The peak detector 1306 may be implemented using any desired peak detection circuit to detect peak signal magnitude. For example, in the case where the conditioned signals are analog signals, a diode, capacitor and bleed resistor combination may be used to detect peak value. On the other hand, in the case where the conditioned signals are digital values, the peak detector 1306 may simply retain the largest numerical value following a reset. The peak detector 1306 resets (e.g., to zero) in response to zero crossing pulses or other signals provided by the zero crossing detector 1304. As a result, the peak detector 1306 outputs a series of signal peak magnitudes, each of which occurs between successive zero crossings.

A summer 1308 receives the series of peak signal magnitudes from the peak detector 1306 and generates interval sums of these peak signal magnitudes for each of the predetermined time intervals or sample intervals. In one example, the summer 1308 may sum a plurality of peak magnitudes (absolute values) occurring within a predetermined number of samples (e.g., 125 samples) collected at a predetermined rate (e.g., 8000 samples per second) from the conditioned signal. However, other sample sizes and sample rates may be used instead to suit the needs of a particular application. The summer 1308 outputs a series of positive interval sum values at a rate equal to the sample rate divided by the sample size for each interval sum. Thus, in the example where the sample rate is 8000 samples/second and the sample size per sum is 125, the summer 1308 provides interval sums at a rate of 64 per second. Additionally, as depicted in FIG. 13, the summer 1308 may also receive a time stamp from a time stamper 1310 that enables the summer 1308 to associate time stamp values with one or more of the interval sums.

The example signature generator 208 may also include a smoother 1312 that performs a smoothing function on the series of sums output by the summer 1308. For example, the smoother 1312 may perform a low pass filter function to eliminate noise and other spurious interference or signal components that may adversely affect signature match detection. The smoother 1312 may successively smooth the data multiple times (e.g., ten times) to achieve a desired smoothness.

The filtering performed by the smoother 1312 may be implemented using any desired combination of passive components (i.e., resistors, capacitors, inductors, etc.), active components (i.e., transistors, operational amplifiers, etc.) and/or digital components (i.e., digital logic, processing units, memory, etc.). There are many well-known analog and numerical (i.e., digital) filtering techniques that may be used to implement the smoother 1312 and, thus, such implementation details are not discussed in greater detail herein.

The example audio signature processor 208 further includes a peak identifier 1314 that receives the smoothed curve from the smoother 1312. The peak identifier 1314 also receives time stamps from the time stamper 1310. Using the time stamps, the peak identifier 1314 and identifies the signal peak(s) in the smoothed curve and outputs the magnitude(s) and temporal location(s) of the identified peak(s) to a feature generator 1316.

The feature generator 1316 receives the signal peaks and temporal location information, and generates normalized curve features based on the signal peaks and temporal locations. An example set of normalized curve features that may be generated by the feature generator 1316 is shown in FIG. 12. After generating the normalized curve features, the feature generator 1316 generates the remaining signature time by assigning a height or magnitude of zero to the signature locations not associated with the normalized curve features (e.g., triangular-shaped portions). The feature generator 1316 then outputs the signature to a correlator 1318.

The correlator 1318 receives the signature from the feature generator 1316 and performs a comparison between the signature and one or more reference signatures. An example comparison that may be performed by the correlator 1318 is a normalized cross-correlation function. However, the correlator 1318 may also perform other comparisons, such as calculating the Mahalanobis distance between the signatures. The reference signatures may be generated by applying a known reference media signal to the signal conditioner 1302, zero crossing detector 1304, peak detector 1306, summer 1308, smoother 1312, peak identifier 1314, and the feature generator 1316 to generate a signature of the reference media as described above. Alternatively or additionally, the correlator 1318 may receive one or more reference signatures from a reference signature database 1320. The reference signature database 1320 may be provided to store known signatures of media content to facilitate identification of an unidentified consumption signal. The correlator 1318 generates an index (e.g., a cross-correlation coefficient) based on the correlation of the consumption signal with a reference signal.

The index value generated by the correlator 1318 is sent to an index comparator 1322. The index comparator 1322 determines whether the index is greater than a threshold indicative of a match. For example, if the correlator 1318 performs a correlation on a signature generated by the feature generator 1316 with a reference signature from the reference signature database 1320, the correlator 1318 may calculate an index of 0.47. The index comparator 1322 compares the index 0.47 to an example threshold value of 0.45. Because the calculated index is greater than the threshold, the index comparator 1322 determines that the media content represented by the generated signature is the same as the media represented by the reference signature. If the index is not greater than the threshold, the correlator 1318 may then perform another correlation with the generated signature and another reference signature to generate another index. Correlation and comparison may repeat until matching media content is determined.

The example threshold used by the index comparator 1322 may be a predetermined value or may be dynamically generated and modified. For example, a first threshold value may be used to determine media exposure during time intervals in a given time period (e.g., every 15 seconds during a day). In the example, using the first threshold value, the audio signature processor 208 is capable of identifying media content during 50% of a monitored time period. The index comparator 1322 may then use a second threshold value to identify media content for time intervals that could not be identified using the first threshold value, thus enabling the index comparator 1322 to identify media content during certain time intervals.

After the index comparator 1322 has identified the media associated with the consumption signal, the index comparator 1322 outputs consumption information to, for example, the site unit 218 of FIG. 2.

Figure 14:
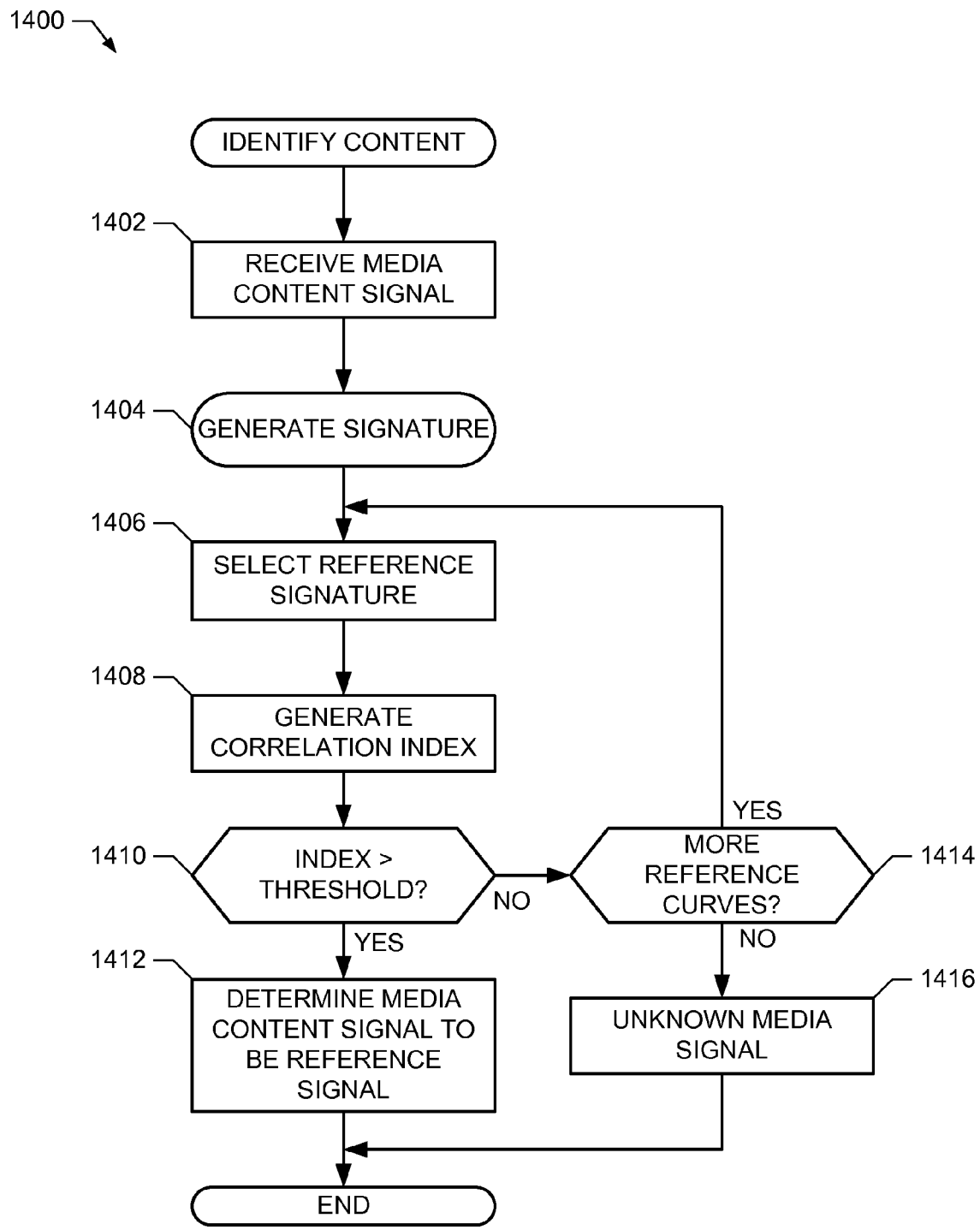
FIG. 14 is a flowchart illustrating an example method to identify media content.

FIG. 14 is a flowchart illustrating an example method 1400 to identify media content. The example method 1400 may be executed by the example audio signature processor 208 described in FIG. 13 to identify media content associated with a consumption signal (e.g., the consumption signal 210 of FIG. 2). The example method 1400 begins by receiving a media content signal (e.g., via the signal conditioner 1302), such as the consumption signal 210 or the reference signal 203 (block 1402). On receiving the media content signal (block 1402), the example signal conditioner 1302, the example zero crossing detector 1304, the example peak detector 1306, the example summer 1308, the example time stamper 1310, the example smoother 1312, the example peak identifier 1314, and the example feature generator 1316 generate a signature of the media content signal (block 1404). Block 1404 may be performed by executing the example method 700 of FIG. 7 using the example signal conditioner 1302, the example zero crossing detector 1304, the example peak detector 1306, the example summer 1308, the example time stamper 1310, the example smoother 1312, the example peak identifier 1314, and the example feature generator 1316.

After generating the signature from the media content signal (block 1404), the example correlator 1318 of FIG. 13 selects a reference signature from, for example, the reference signature database 1320 or a signature generated from a reference signal (block 1406). Once a reference signature is selected, the correlator 1318 performs a correlation on the generated signature and the reference signature to generate a correlation index (block 1408). The example correlation index is passed to the index comparator 1322, which determines if the correlation index is greater than a threshold (block 1410). If the index is greater than the threshold (block 1410), the index comparator 1322 determines the media content signal is the same as the reference signal (block 1412), and the example method 1400 may end.

However, if the index comparator 1322 determines the index is not greater than the threshold (block 1410), the correlator 1318 determines whether there are additional reference curves for comparison (block 1414). Additional reference curves may come from additional media sources or from the reference signature database 1320. If there are additional reference curves for comparison (block 1414), control returns to block 1406 to select a reference signature. If there are no additional reference curves (block 1414), the index comparator 1322 determines that the media signal is unknown (block 1416). In such a case, the unknown media content signal and/or the signature generated therefrom may be sent to a central location (e.g., the site unit 218 of FIG. 2) for additional processing.

Although the example normalized curve features are shown as triangular-shaped peaks, other shapes, heights, and/or widths may be used to, for example, further increase detection accuracy or increase correlation speed.

The example systems, methods, apparatus, and articles of manufacture are useful in identifying unknown media content based on known media content. In one example application, the systems described above may be used to verify exposure of advertisements in a retail store. The example application may have an audio and video playback device (e.g., a television set) to show video advertisements to in-store customers. Advertisers that want to verify that their paid advertisements are given sufficient exposure in-store may utilize the example systems, methods, apparatus, and articles of manufacture to monitor the advertisements shown on the playback device and identify them by comparing each exposed advertisement to a small library (e.g., 10-20 advertisements) of known advertisements. Each identified advertisement is then counted and the total counts can be reported to the advertiser to verify sufficient exposure.

More generally, the example systems, methods, apparatus, and articles of manufacture may be used to identify a clip or short segment of unidentified media content within a large library of known media content. Such identification may be useful in digital rights management, in detecting copyright infringement, or in any other application that may benefit from media content identification. To identify a clip or short segment, the example system generates a signature of at least a portion of the media to be identified, and performs a correlation or other comparison between the signature and a library of reference signatures.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in any combination of hardware, firmware and/or software. Accordingly, while the above specification described example systems, methods, apparatus, and articles of manufacture, the examples are not the only way to implement such systems, methods, apparatus, and articles of manufacture. Therefore, although certain example systems, methods, apparatus, and articles of manufacture have been described herein, the scope of coverage of this patent is not limited thereto. On the contrary, this patent covers all systems, methods, apparatus and articles of manufacture fairly falling within the scope of the appended claims either literally or under the doctrine of equivalents.

What is claimed is:

1. A method to identify media, comprising:
generating, by executing an instruction with a processor, interval sums based on peaks in a media signal received at a monitored site corresponding to media;
identifying, by executing an instruction with the processor, signal peaks based on the generated interval sums;
generating, by executing an instruction with the processor, a signature of the received media signal based on normalized curve features, wherein the normalized curve features respectively correspond to the identified signal peaks at corresponding temporal locations of the corresponding signal peak; and
determining, by executing an instruction with the processor, whether the media signal corresponds to a reference signal based on a comparison of a reference signature and the signature of the received media signal.

2. The method as defined in claim 1, further including smoothing the generated interval sums.

3. The method as defined in claim 1, wherein the determining of whether the media signal corresponds to the reference signal includes performing a correlation of the signature of the media signal and the reference signature.

4. The method as defined in claim 1, further including generating the normalized curve features by respectively generating peaks having heights, widths, and center locations.

5. The method as defined in claim 4, wherein the heights of the normalized curve features are equal and the widths of the normalized curve features are equal.

6. The method as defined in claim 4, wherein the height of the signature of the media signal is substantially zero at temporal locations other than locations corresponding to the normalized curve features.

7. The method as defined in claim 1, wherein the determining of whether the media signal corresponds to the reference signal includes determining whether an index value is greater than a threshold.

8. The method as defined in claim 1, wherein the media is associated with at least one of a broadcast program or a local media source.

9. The method as defined in claim 1, wherein the media includes at least one of audio or video.

10. The method as defined in claim 1, further including generating the reference signature by:
generating second interval sums based on peaks in the reference signal;
identifying second signal peaks based on the generated second interval sums; and
generating the reference signature based on second normalized curve features, wherein the second normalized curve features respectively correspond to the second signal peaks at corresponding temporal locations of the one of the second signal peaks.

11. A method to monitor exposure to media, comprising:
generating interval sums based on peaks in a media signal received at and collected from an exposure site by executing an instruction with a processor;
identifying signal peaks based on the generated interval sums by executing an instruction with the processor;
generating a signature of the media signal based on normalized curve features by executing an instruction with the processor, the normalized curve features respectively corresponding to the signal peaks at corresponding temporal locations of the corresponding signal peaks; and
identifying the media signal by performing a comparison of the signature of the media signal and a reference signature representative of known media by executing an instruction with the processor.

12. The method as defined in claim 11, further including smoothing the generated interval sums.

13. The method as defined in claim 11, further including:
generating second interval sums based on peaks in a known media signal;
identifying second signal peaks based on the generated second interval sums; and
generating the reference signature based on second normalized curve features, wherein the second normalized curve features respectively correspond to the second signal peaks at corresponding temporal locations of the corresponding second signal peaks.

14. The method as defined in claim 11, further including identifying a second media signal based on a comparison of a signature of the second media signal and a reference signature representative of known media.

15. The method as defined in claim 14, wherein the identifying of the media signal and the second media signal includes comparing first and second index values with a first threshold.

16. The method as defined in claim 15, further including identifying a third media signal, wherein exposure to the third media signal occurs between exposure to the first media signal and exposure to the second media signal, and identifying the third media signal includes comparing a third index value with a second threshold lower than the first threshold.

17. An apparatus to identify media, comprising:
a summer to generate interval sums based on peaks in a media signal received at a monitored site;
a peak identifier to identify signal peaks based on the generated interval sums;
a feature generator to generate a signature of the media signal based on normalized curve features, the normalized curve features respectively corresponding to the identified signal peaks at corresponding temporal locations of the corresponding signal peaks; and
an index comparator to determine whether the media signal corresponds to a reference signal based on a comparison of the signature of the media signal and a reference signature corresponding to the reference signal, at least one of the summer, the peak identifier, the feature generator, or the index comparator including hardware.

18. The apparatus as defined in claim 17, further including a smoother to smooth the interval sums.

19. The apparatus as defined in claim 17, further including a correlator to perform a correlation of the signature of the media signal and the reference signature, the index comparator to determine whether the media signal corresponds to the reference signal based on the correlation.

20. The apparatus as defined in claim 17, wherein the feature generator is to generate the normalized curve features by generating peaks having respective heights, respective widths, and respective center locations.

21. The apparatus as defined in claim 20, wherein the feature generator is to generate the respective peaks to have same heights and to have same widths.

22. The apparatus as defined in claim 20, wherein the height of the signature of the media signal is substantially zero at temporal locations other than locations corresponding to the normalized curve features.

23. The apparatus as defined in claim 17, wherein the index comparator is to determine whether the media signal corresponds to the reference signal by determining whether an index value is greater than a threshold.

24. The apparatus as defined in claim 17, wherein the media is associated with at least one of a broadcast program or a local media source.

25. The apparatus as defined in claim 17, wherein the summer is to generate second interval sums based on peaks in a known media signal, the peak identifier is to identify second signal peaks based on the generated second interval sums, and the feature generator is to generate the reference signature based on second normalized curve features, the second normalized curve features respectively corresponding to the second signal peaks at respective temporal locations of the second signal peaks.

26. A tangible computer readable storage device comprising instructions which, when executed, cause a machine to at least:
generate interval sums based on peaks in a media signal received at a monitored site;
identify signal peaks based on the generated interval sums;
generate a signature of the media signal based on normalized curve features, the normalized curve features respectively corresponding to respective ones of the identified signal peaks at corresponding temporal locations; and
determine whether the media signal corresponds to a reference signal based on a comparison of a reference signature and the signature of the media signal.

27. The tangible computer readable storage device as defined in claim 26, wherein the instructions further cause the machine to smooth the generated interval sums.

28. The tangible computer readable storage device as defined in claim 26, wherein the instructions cause the machine to determine whether the media signal corresponds to the reference signal by performing a correlation of the signature of the media signal and the reference signature.

29. The tangible computer readable storage device as defined in claim 26, wherein the instructions further cause the machine to generate the normalized curve features by respectively generating peaks having heights, widths, and center locations.

30. The tangible computer readable storage device as defined in claim 29, wherein the heights of the normalized curve features are equal and the widths of the normalized curve features are equal.

31. The tangible computer readable storage device as defined in claim 29, wherein the height of the signature of the media signal is substantially zero at temporal locations other than locations corresponding to normalized curve features.

32. The tangible computer readable storage device as defined in claim 26, wherein the instructions cause the machine to determine whether the media signal corresponds to the reference signal by determining whether an index value is greater than a threshold.

33. The tangible computer readable storage device as defined in claim 26, wherein the media is associated with at least one of a broadcast program or a local media source.

34. The tangible computer readable storage device as defined in claim 26, wherein the instructions cause the machine:
generate second interval sums based on peaks in the reference signal;
identify second signal peaks based on the generated second interval sums; and
generate the reference signature based on second normalized curve features, the second normalized curve features respectively corresponding to respective ones of the second signal peaks at corresponding temporal locations.

* * * * *